United States Patent [19]
Coli et al.

[11] Patent Number: 5,001,566
[45] Date of Patent: Mar. 19, 1991

[54] DOCUMENT READING APPARATUS

[75] Inventors: Giuseppe Coli, Banchette; Giampiero Meazza, Ivrea; Roberto Cedone, Pavone, all of Italy

[73] Assignee: Ing. C. Olivetti & C., S.p.A., Ivrea, Italy

[21] Appl. No.: 337,851

[22] Filed: Feb. 24, 1989

[30] Foreign Application Priority Data

Mar. 14, 1988 [IT] Italy ................. 67210 A/88

[51] Int. Cl.$^5$ .......................................... H04N 1/393
[52] U.S. Cl. .................................. 353/451; 358/474; 358/496; 358/498
[58] Field of Search ............... 358/498, 496, 474, 451; 250/578

[56] References Cited
U.S. PATENT DOCUMENTS
4,429,333 1/1984 Davis et al. ................. 358/496

Primary Examiner—Edward L. Coles, Sr.
Attorney, Agent, or Firm—Banner, Birch, McKie & Beckett

[57] ABSTRACT

The original documents of A4 or A3 format are selectively read by a scanning apparatus which is integrated into a system for producing and transmitting images. The originals of A4 format are normally positioned on a fixed exposure surface and the originals of A3 format are introduced into a separate device for transporting documents, which is adjacent to the fixed exposure surface. A carriage with lamps is slidable below the exposure surface to illuminate the A4 original while to illuminate the A3 original the carriage is positioned into a fixed position corresponding to the separate reading device where the original A3 is slid with respect to the carriage past an exposure zone. The reflected images of the originals are passed by means of mirrors mounted on the carriage to a lens which reflects them on to a photo-detector device which converts the light rays into digital electrical signals. To adjust the focal lengths of the lens to the various dimensions of the A3 and A4 formats and to compensate for the different distances (difference D) of the two types of originals from the lens, two of the mirrors are mounted on an auxiliary frame which is movable on the carriage. The auxiliary frame is displaced by its own motor and a lead-screw to different positions in relation to the type of original which is to be read.

9 Claims, 5 Drawing Sheets

DOCUMENT READING APPARATUS

BACKGROUD OF THE INVENTION

The present invention relates to an apparatus for scanning reading of documents of different formats, operable to convert the read images into digital electrical signals.

U.S. Pat. No. 4,321,627 discloses an ink jet printer controlled by a document scanning reader. The documents are disposed on a fixed exposure surface and are scanned by an optical system mounted on a carriage which is movable parallel to the exposure surface. By means of an oscillating mirror the optical system scans successive lines of the document in a direction which is perpendicular to the movement of the carriage and passes the reflected images to fixed mirrors and through a lens to a photodetector element which converts them into electrical signals with a single constant reduction ratio.

In another version of the printer the optical system is fixed and the document is scanned in a moving mode while it is displaced with respect to the optical system by two rotary rollers. In both those versions, the optical system of the printer does not provide means for displacing the lens and for modifying the relative positions of the mirrors whereby the document reading operation is carried out only with a fixed reduction ratio. Therefore such a reader does not permit reading of documents of different formats either on the fixed surface or by way of the roller-type entertainment arrangement.

Italian patent No 1 187 967 in the name of the present Assignee also discloses a document scanning reader for an ink jet colour printer in which the documents are disposed on a fixed exposure surface and are scanned by an optical system mounted on a carriage which is movable parallel to the exposure surface. The optical system scans successive lines of the document and reflects the image thereof, reduced with a fixed reduction ratio, on to a photodetector element. The photodetector element converts the light energy into electrical signals. In order to be able to use the reader with a wide variety of documents, the exposure surface is so dimensioned as to accommodate documents of large format whereby the apparatus is of large dimensions and is thus not suitable for being combined with other pieces of equipment on the desk top of a working station.

SUMMARY OF THE INVENTION

An object of the present invention is to provide a document reading apparatus for scanning the reading of documents of different formats, for example A4 and A3, with a reading apparatus of small dimensions and with a high degree of operational reliablity.

It is another object to provide an apparatus for scanning the reading of documents of different formats comprising a device adjacent to an exposure surface for transporting documents for reading a document introduced thereinto and capable of moving the document relative to a reading optical system mounted on a carriage, control means being provided to select scanning between a first reading mode in which the carriage is moved across the exposure surface by an electric motor and a second reading mode in which the optical system is kept stationary and the transporting device is actuated to move the document, the control means being operative for adjusting the optical system in accordance with the selected reading mode.

These and other features of the invention will be more clearly apparent from the following description of a preferred embodiment which is given by way if non-limiting example with reference to the accompanying drawings.

DESCRIPTION OF THE PREFERRED EMBODIMENT.

The reading apparatus according to the invention represents the first link in a chain of items of equipment constituting what is known as a 'computerised office system for data processing'. That system is organised typically to perform the following functions:

(a) reproduction of the items of information on a document to create fresh documents or for further working with the information;

(b) electronic storage of the items of information to create a data archive; and (c) electronic transmission of the information to a distant working station over a telephone communication cable.

Such a system comprises one or more working stations, each of which is managed by a Personal Computer connected to one or more peripheral units such as for example, besides the reading apparatus, a keyboard, a printer, a display, an electronic blackboard etc. Normally the peripheral units of each working station are controlled by a single operator and are thus disposed one beside the other on a working desk in such a way as to be easily accessible to the operator.

Figure 1:
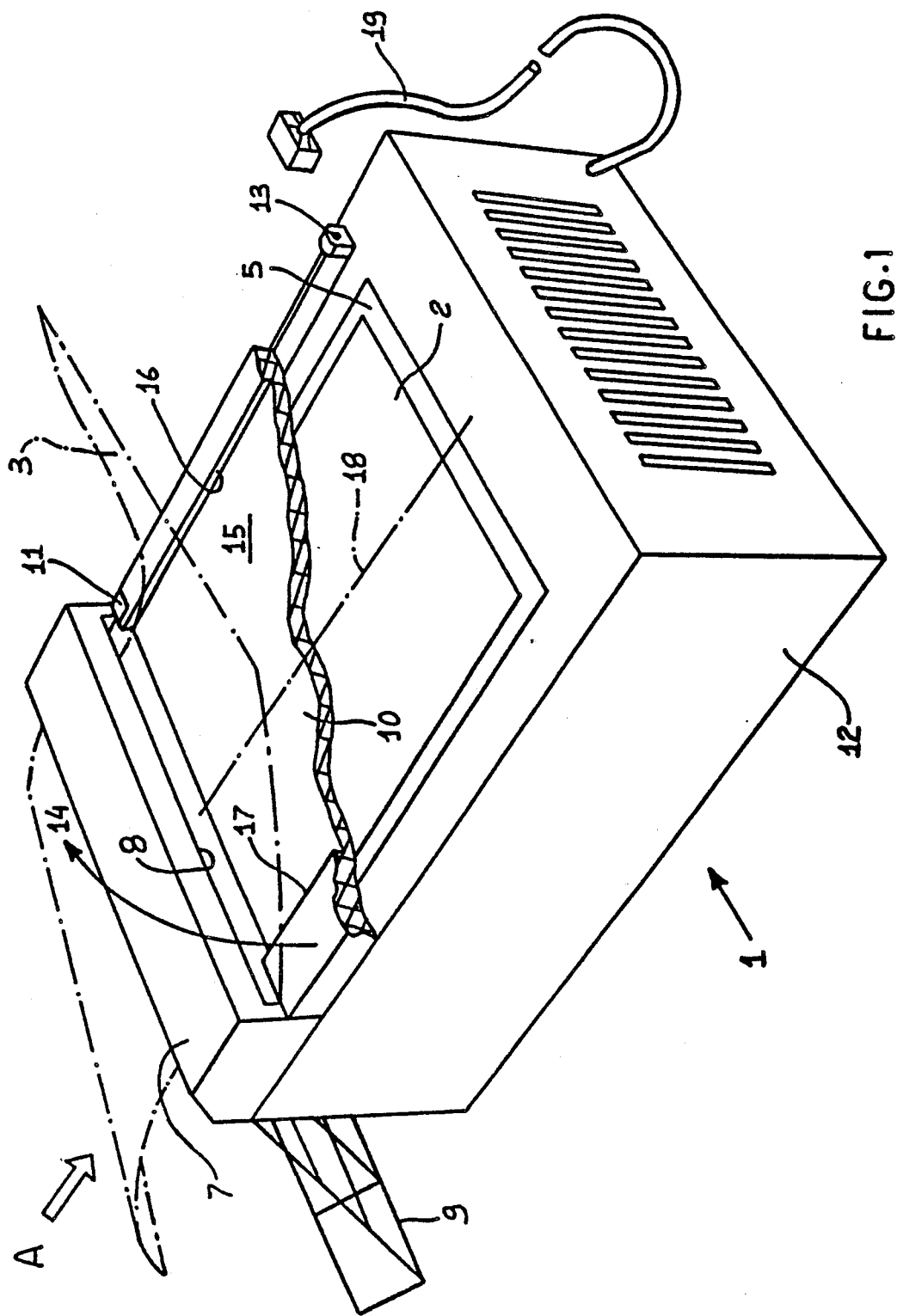
FIG.1 is a perspective view of the reading apparatus according to the invention.
Figure 2:
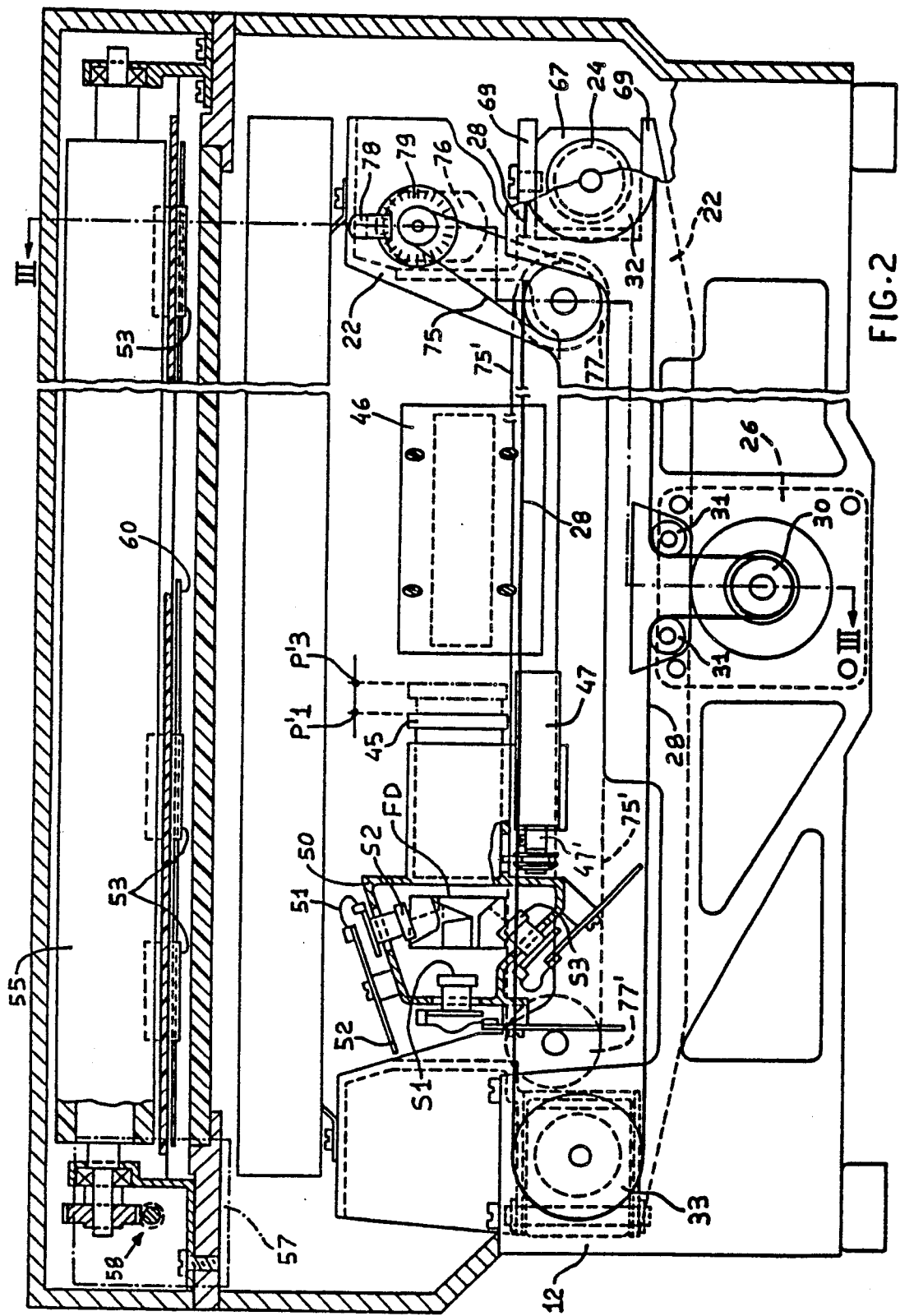
FIG. 2 is a partly sectional view from the direction A in FIG. 1.
Figure 3:
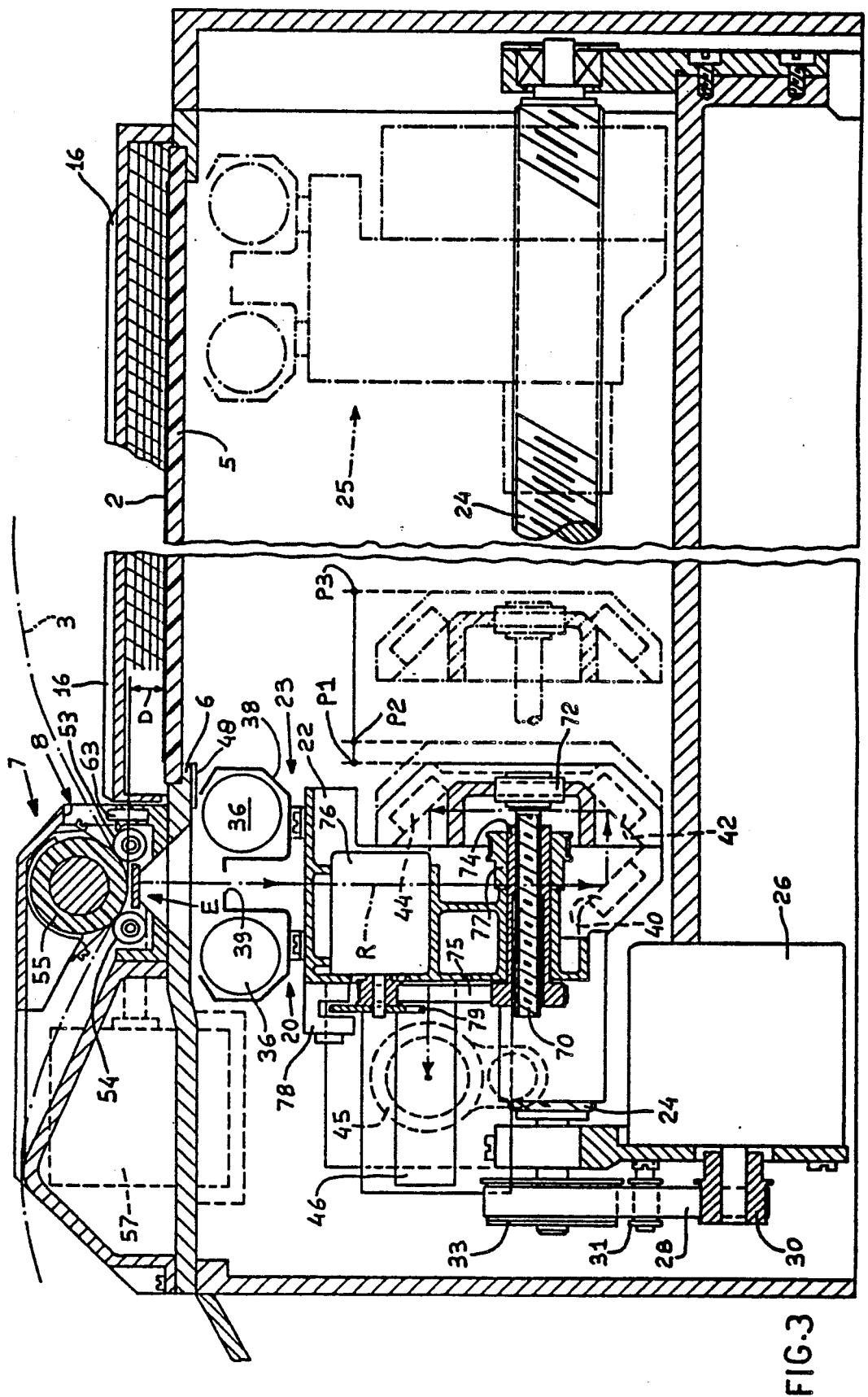
FIG. 3 is a view in vertical section taken along line III—III in FIG. 2.
Figure 4:
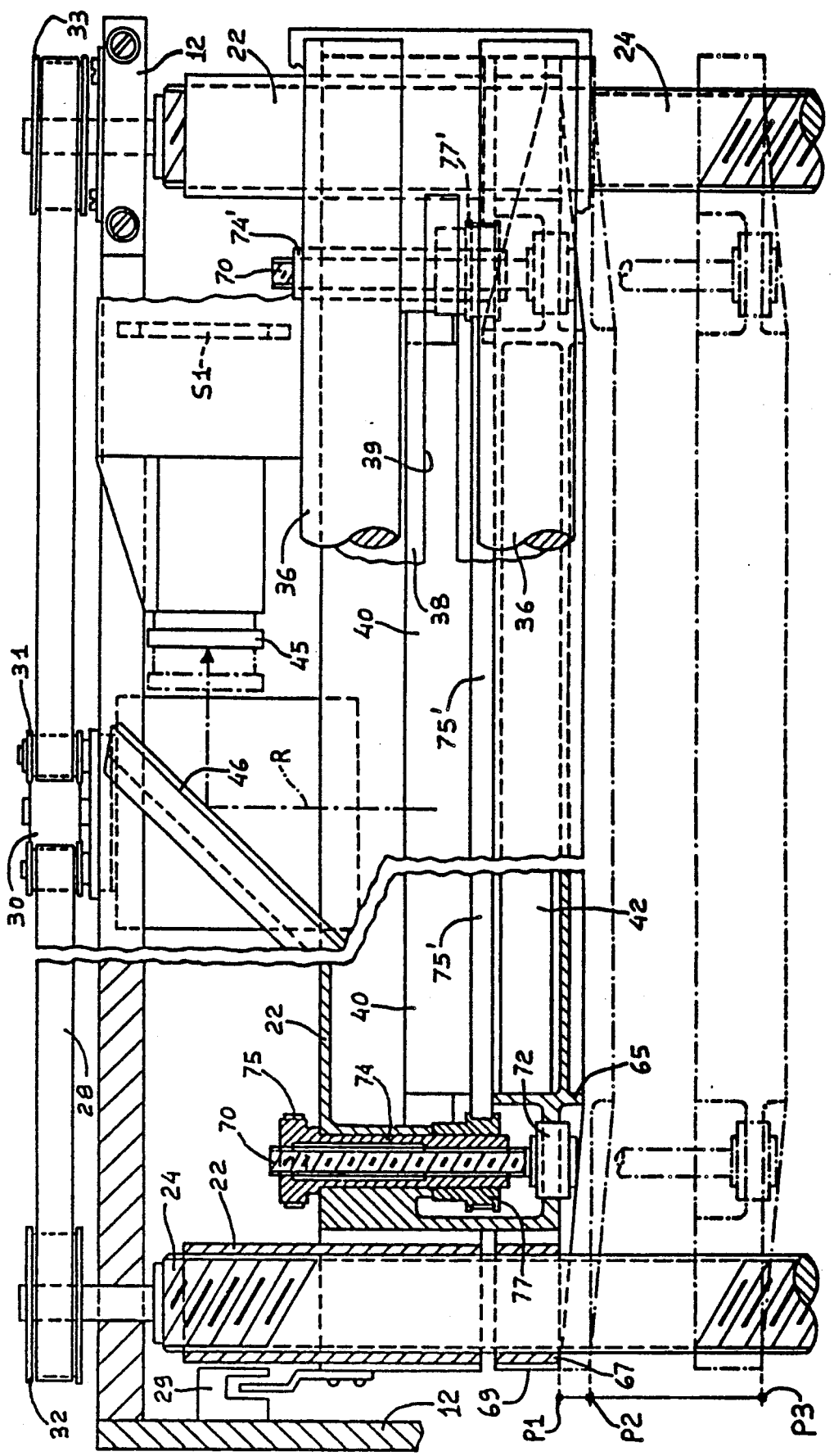
FIG. 4 is a partly sectional view of the scanning carriage in FIG. 3.

Referring to FIG. 1, the apparatus 1 for reading documents 2, 3 comprises a fixed transparent exposure surface 5 on the upper face of the casing 12. To reduce the dimensions of the apparatus 1 in plan view, the exposure surface 5 is dimensioned to accommodate a document 2 of a format which is no greater than the standard A4 format.

Disposed adjacent the exposure surface 5 and on the left-hand side of the apparatus 1 in FIG. 1 is a device 7 for transportation or insertion of the documents 3 to be read, which may be of a format which is larger than the A4 format, for example A3. The document is introduced into the device 7 manually through a slot 8 and, after having been scanned by an optical system which is described hereinafter, is deposited on a tray 9.

A cover 10 for covering the documents 2 on the surface 5 is hinged at the points indicated by 11 and 13 and can be pivoted back in the direction indicated by the arrow 14. To facilitate insertion of documents of both A4 and A3 format into the slot 8, the top face 15 of the cover 10 carries two straight edged 16 and 17 which are parallel to the direction of insertion.

The edges 16 and 17 are disposed on two opposite sides with respect to a centre line 18 of the surface 5, at distances equal to half the width respectively of the A3 and the A4 formats. When therefore the long edge of a sheet of A3 size is positioned against the edge 16 or the long edge of a sheet of A4 size is positioned against the edge 17, the two sheets of different formats are perfectly aligned with the direction of insertion into the slot 8 and in a symmetrical position with respect to the line 18 of the exposure surface 5.

Referring to FIGS. 2 to 5, the documents 2 or 3 are read by a scanning operation by means of a single optical system 20. To read the document 2 which is positioned on the exposure surface 5, the optical system 20 slides below the exposure surface 5 from a position 23 (see FIG. 3) to a position 25 at a predetermined scanning speed. In contrast, to read the document 3 in a moving mode by way of the device 7, the optical system 20 remains stationary in the position 23, corresponding to an exposure zone E. A sensor 29 (see FIG. 4) which is fixed to the structure 12 and which is activated by a blade member 29 movable in fixed relationship with the optical system 20 signals correct positioning of the optical system 20 in position 23. The optical system 20 (see FIG. 3) is mounted on a carriage 22 which is moved and supported by two parallel screws 24 which are rotatable on the frame structure 12 of the reading apparatus. The screws 24 are rotated by a stepping motor 26 (see FIG. 2) by means of a belt 28 which passes around pulleys 30, 31, 32 and 33.

The motor 26 is controlled by a control circuit such as to cause the carriage 22 to advance intermittently by elementary steps which are variable in dependence on the desired reading definition defined in dots per inch or d.p.i. For example, to effect reading operations with levels of definition of 400 d.p.i.; 300 d.p.i.; and 200 d.p.i, the motor is respectively controlled with three, four and six pulses for each angular step of the screws 24, corresponding to a scanning line on the document.

The optical system 20 comprises two wide-spectrum lamps 36 (see FIGS. 3 and 4) for illumination of the documents, the reflected images of which are delimited by a field diaphragm 38. The diaphragm 38 comprises a slot 39 extending perpendicularly to the motion of the carriage 22 over the entire width of the exposure surface 5. A group of four mirrors 40, 42, 44 and 46 diverts the reflected image through a lens 45 on to a photoelectric detector 50 (see FIG. 2).

The detector 50 is of known type, for example of the type described in the above-mentioned Italian patent, and comprises a dichroic filter FD. The dichroic filter FD breaks down the reflected rays of the image into three chromatic components which are concentrated on three photoelectric sensors S1, S2 and S3 of the CCD type (Charge Coupled Device).

The three sensors S convert the light flux coming from elementary areas referred to as 'pixels' of the read image into electrical signals corresponding to each of the three chromatic components of the reflected image.

Each of the three sensors is connected by a flat cable 51 to a printed circuit board 52 fixed directly on the structure of the detector 50 which supports the sensors S. Each board 52 contains an amplifier AMP (see FIG. 6) for the signal emitted by each sensor S, an analog-digital converter ADC and a compensation circuit CL. The circuit CL is used to refer the video signal corresponding to the read images to a standard colour sample, for example white, which is generated on each occasion before scanning a document, as will be described hereinafter. For example, the circuit CL effects compensation in respect of the variations in luminosity of the lamps 36, disparities in respect of the levels of illumination of the documents and differences in output of the photosensors S, in the manner described in Italian patent No. 1 183 816 granted to the present applicants.

As emphasized hereinbefore, the documents 3 of larger format are read in a moving mode in the insertion device 7 (see FIGS. 3 and 5), with the carriage 22 being held stationary. The document 3 is advanced through the exposure zone E by a line of in-feed rollers 53 pressed against a feed roller 55. The roller 55 is rotated by a stepping motor 57 by means of a speed reducer 58. A sensor 63 disposed at the mouth of the slot 8 detects the edge of a document 3 and produces a signal for starting the motor 57. In the exposure zone E the document 3 is illuminated by the lamps 36 through a strip 37 of transparent material, for example glass. The document 3 is bent in accordance with the curvature of the roller 55 by a series of rigid vertical guide plates 59 which facilitate engagement of the document between the discharge rollers 54.

Before the operation of scanning a document disposed on the exposure surface 5 or before a document passes through the exposure zone E, a beam of white light is applied to the sensors S to generate the standard colour sample and to permit the circuit CL (FIG. 6) to refer thereto the video signals corresponding to the successively scanned images.

For that purpose a thin strip 48 (see FIG. 3) which is white in colour is glued to the underside of an edge 6 of the support for the exposure surface 5, in the area where the scanning travel movement of the carriage 22 begins. The strip 48 is disposed parallel to the slot 39 of the field diaphragm 38 and extends over the entire width of the exposure surface 5 (perpendicularly to the centre line 18 in FIG. 1).

Similarly in the insertion device 7 a portion of the roller 55 facing the glass 37 is covered by a flexible sheet portion 60 which is white in colour and which extends partially around the roller 55 and which is fixed at two ends 61 and 62 to a wall 64 of the device 7. The sheet portion 60, at the positions corresponding to the rollers 53 and 54, is provided with openings 60' to permit the rollers 53 and 54 to come into contact with the roller 55 to feed the document 3 by frictional engagement. In the exposure zone E the document 3 passes between the glass 37 and the sheet portion 60 without touching the roller 55.

In order to be able to scan a document 3 with different levels of definition, the feed roller 55 is rotated intermittently by the stepping motor 57 with angular steps which are dependent on the value of the defined levels of definition, similarly to the situation described in regard to the stepping motor 26. In order to facilitate engagement of a document 3 in the slot 8, the rollers 53, the roller 55 and the glass 37 are disposed in a position which is higher than the surface 5 by a distance indicated at 'D', whereby the document 3 is read at a distance from the lens 45 which is greater by 'D' (see FIG. 3) with respect to the distance of the documents which are read on the surface 5. To keep the overall distance between the original 3 on the glass 37 and the lens 45 unchanged, the mirrors 42 and 44 are displaced on the carriage 22 by a distance D/2 from the position P2 to the position P1. In that way the increase 'D' is nullified by the displacement 'D/2' (which is counted twice) of the mirrors 42 and 44 in the direction in which their distance from the lens 45 is reduced. Thus, to read a document of the same format, for example A4, on the surface 5 or by way of the insertion device 7, it is sufficient to move the mirrors 42 and 44 from P2 to P1 while it is not necessary to displace the lens 45 since a variation in the reduction ratio is not involved. The variation in the reduction ratio to reproduce the format A3 is however achieved by displacing both the mirrors 42, 44 and the lens 45.

To produce such movements, the mirrors 42 and 44 are mounted on a single frame structure 65 which is movable with respect to the carriage 22 by a dc motor 76 (FIG. 3) mounted on the carriage 22. The frame structure 65 is guided by two bushes 67 slidable on the outside surfaces of the screws 24 and pivoted on the ends 69 of the structure 65.

The structure 65 is moved by two screwthreaded pins 70 and 70' (see FIGS. 2 and 4) which are parallel to the screws 24. The pins 70 and 70' are fixed to the frame structure 65 by a bracket 72 and are screwed in screwthreaded bushes 74 and 74' which are rotatable on the carriage 22.

The bush 74 is rotated by means of a belt 75 by the dc motor 76. The rotary movement of the motor 76 is controlled in conventional manner in response to the signals generated by an encoder 78 having a strobe disc 79 fixed on the shaft of the motor 76.

The bush 74' is rotated by the bush 74 by means of a belt 75' which passes around two identical pulleys 77 and 77' which are respectively fixed on the bushes 74 and 74'.

With the mirrors 42 and 44 in positions P1 and P2, the arrangement provides for reading of documents of a small format which is not greater than the standard A4 format, being scanned respectively by way of the device 7 or on the fixed exposure surface 5. In position P3 documents of a format between A4 and A3 are read, being scanned by way of the device 7. In order to take account of the variation in the reduction ratio, to reproduce a format whcih is larger than A4 format, for example A3 format, the mirros 42 and 44 are displaced by the motor 76 from position P1 to position P3 and the lens 45 is displaced (see FIG. 2) from a position P'1 to a position P'3 corresponding to the position P3 by a motor 47 and a screw and nut assembly 47'.

The movements P2-P3 of the mirrors 42 and 44 and P'1-P'3 of the lens 45 are so selected that the new reduction ratio for reproducing the A3 format with respect to the A4 format can be produced.

Figure 6:
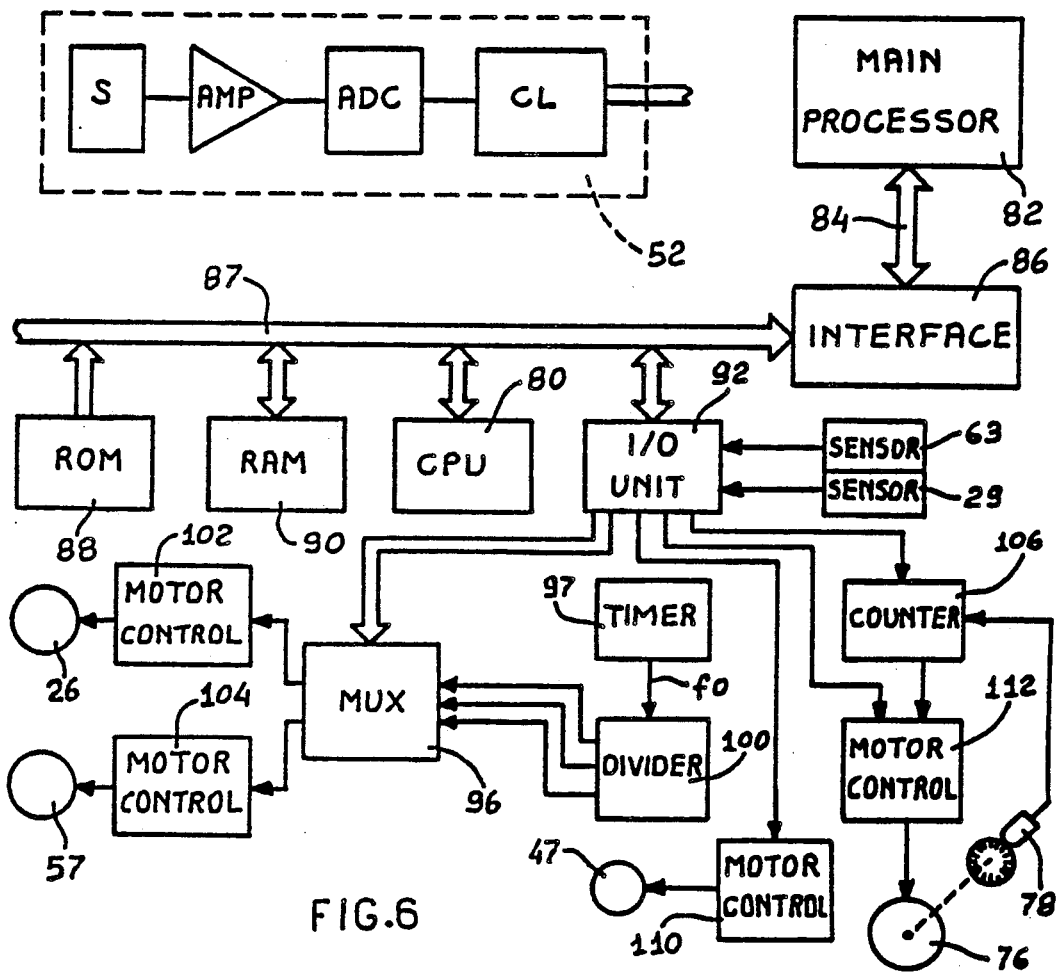
FIG. 6 is a block circuit diagram of the control circuit of the reading apparatus shown in FIG. 1
Figure 5:
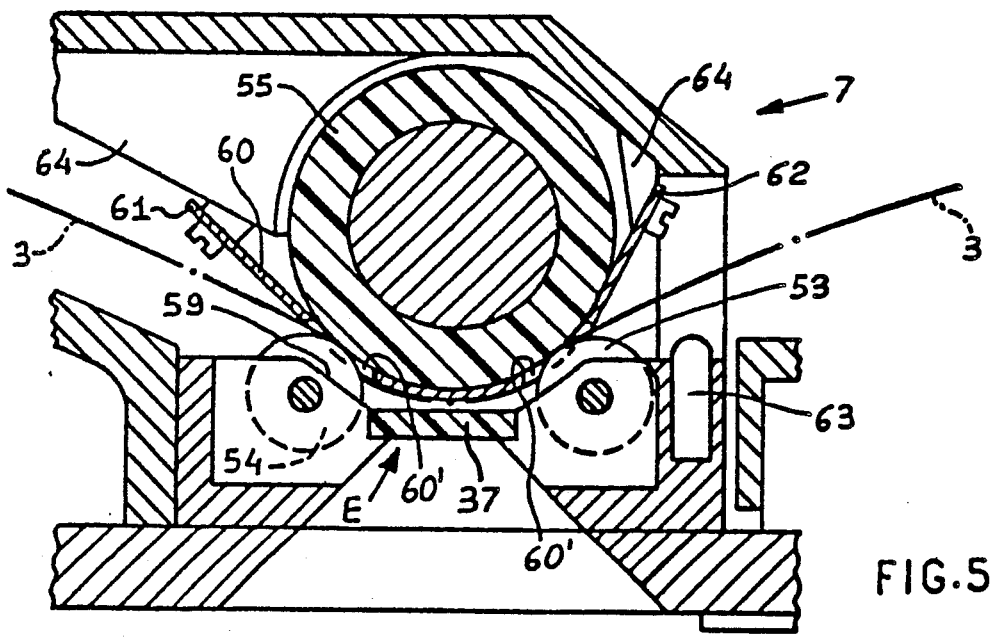
FIG. 5 is a view in section and on an enlarged scale of a detail from FIG. 3.

FIG. 6 shows a block circuit diagram of a circuit for controlling the above-described reading apparatus. A microprocessor 80 manages the operation of all the active components of the apparatus and is conditioned by commands given from a central processor 82, for example a Personal Computer, by way of a bus 84. An interface module 86 governs signal traffic on the bus 84 in accordance with a conventional communication standard, for example the standard IEEE 488.

The microprocessor 80 is connected by means of a bus 87 to a program memory 88 of ROM type and a working memory 90 of RAM type. An input/output (I/O) unit 92 connected to the bus 87 of the microprocessor 80 passes actuation commands to the motors 26, 47, 57 and 76 and transfer signals emitted by the sensors 29 and 63 to the microprocessor 80.

Each of the motors 26 and 57 of the carriage 28 and the reading device 7 respectively is controlled in respect of frequency by means of its own multiplexer circuit 96 controlled by the microprocessor 80. A generator 97 generates pulses at a predetermined rate $f_O$ which is defined by a divider circuit 100 for numbers proportional to the predetermined levels of definition. For example, assuming as the definition values the above-mentioned values of 400, 300 and 200 d.p.i., the rate $f_O$ is divided by 3, 4 and 6 respectively. Under the control of the microprocessor 80 the multiplexer 96 selects one of the three control rates and applies it to the circuits 102 and 104 for controlling the motors 24 and 57 respectively.

When for example a document of A3 format is to be reproduced, the procedure is as follows:

The document 3 is introduced into the slot 8 (see FIG. 1). The information relating to the format to be reproduced and to the value of the preselected level of reading definition are communcated to the microprocessor 80 by way of the Personal computer 82 (see FIG. 6). The microprocessor 80 then causes actuation of the motors 76 and 47 (see FIG. 3) for respectively displacing the mirrors 42 and 44 and the lens 45 into positions P3 and P'3. In particular the motor 76 is controlled by a feedback circuit in which the pulses generated by a position coding means or encoder 78 are counted by a counter 106 (see FIG. 6). The motors 76 and 47 are stopped when a count number corresponding to the position P3 is reached.

At the same time the microprocessor 80 actuates the motor 26 of the carriage 22 to position the optical system 80 at a position corresponding to the reading zone E (see FIG. 3) in response to a signal from the position sensor 29. The sensor 63 which is activated by the presence of the document 3 conditions the microprocessor 80 to start the motor 57 at the speed corresponding to the preselected level of reading definition. The document is thus advanced by the rollers 53 and 54 through the reading device 7. The motor 57 is stopped by the microprocessor 80 after a predetermined time from the passage of the trailing edge of the document 3 over the sensor 63.

It will be appreciated that modifications, additions and substitution of parts may be made in the scanning reading apparatus without thereby departing from the scope of the invention.

We claim:

1. In a document reading apparatus for scanning of documents of at least two different formats comprising a fixed surface for the exposure of a document to be read, optical scanning means including a plurality of mirrors and a lens, said optical scanning means being movable parallel to the exposure surface for scanning an image of the document and being so adjustable as to vary the reduction ratio of said image, optical sensing means operable to convert said image read on the document into electrical signals, said scanning means and said sensing means being mounted on a carriage slidable with respect to said fixed surface, document transporting means disposed adjacent said fixed surface and capable of accommodating documents of different formats, for moving said documents introduced thereinto relative to said optical scanning means for scanning said documents, control means provided to select scanning between a first reading mode in which the carriage is moved across the fixed surface by an electric motor and a second reading mode in which said optical scanning means is kept stationary and said document transporting means is actuated to mvoe the document, the improvement comprising an auxiliary frame slidably mounted on said carriage and carrying at least one of said mirrors, said auxiliary frame being movable relative to said carriage to position said one mirror in a first position corresponding to the first reading mode and in at least one second position corresponding to the second reading mode for varying the reduction ratio of the image of documents of different formats.

2. Apparatus according to claim 1, wherein said document transporting means comprises an entrainment roller rotated by a corresponding electric motor to transport a document in front of an exposure slot disposed adjacent said fixed surface at a position corresponding to said second reading mode, and wherein said fixed surface is protected by a cover which can be pivoted back, the cover comprising rectilinear guide means disposed on an outside top face opposite to the exposure surface, for guiding said documents of different formats in the direction of movement through the transport means, said guide means comprising at least two edges which are raised with respect to said face and disposed on opposite sides with respect to a center line of said exposure surface perpendicular to the roller, each edge being displaced at a distance from said line which is equal to half the width of first and second formats, respectively, whereby documents of different formats are introduced into the transport device in symmetrical positions with respect to said center line.

3. Apparatus according to claim 1, comprising lens displacing means controlled by said control means in dependence on a selected reduction ratio for correspondingly displacing the lens with respect to said sensing means.

4. Apparatus according to claim 3, wherein said lens displacing means comprises a corresponding electric motor and a screw-and-nut assembly.

5. Apparatus according to claim 1, wherein said auxiliary frame comprises two screwthreaded pins fixed thereon and in engagement with two corresponding screwthreaded bushes rotatably mounted on the carriage for displacing the frame from the first position to the second position, with respect to said carriage.

6. Apparatus according to claim 5, wherein said bushes are rotated at the same speed by an electric motor mounted on the carriage, the bushes being connected together by a belt.

7. Apparatus according to claim 6, or 4, wherein said motors are controlled by an input-output unit controlled by a microprocessor.

8. Apparatus according to claim 7, wherein said motor of the carriage is a stepping motor controlled by the input-output unit through a common exchange unit.

9. Apparatus according to claim 6, wherein said motor for displacement of said auxiliary frame is an electric d.c. motor controlled by the input-output unit and by a position encoder by way of a feed-back circuit.

* * * * *